(12) United States Patent
Henke et al.

(10) Patent No.: US 7,419,564 B2
(45) Date of Patent: Sep. 2, 2008

(54) BINDING AGENTS HAVING BARRIER PROPERTIES

(75) Inventors: Guenter Henke, Neuss (DE); Kamil Kalus, Duesseldorf (DE); Annabelle Guilleux, Duesseldorf (DE)

(73) Assignee: Henkel Kommanditgesellschaft Auf Aktien, Duesseldorf (DE)

(*) Notice: Subject to any disclaimer, the term of this patent is extended or adjusted under 35 U.S.C. 154(b) by 0 days.

(21) Appl. No.: 11/388,000

(22) Filed: Mar. 23, 2006

(65) Prior Publication Data

US 2006/0162860 A1 Jul. 27, 2006

Related U.S. Application Data

(63) Continuation of application No. PCT/EP2004/010381, filed on Sep. 16, 2004.

(30) Foreign Application Priority Data

Sep. 25, 2003 (DE) .............................. 103 44 448

(51) Int. Cl.
- B29C 65/48 (2006.01)
- C08G 18/04 (2006.01)
- C08G 18/06 (2006.01)
- C08F 2/48 (2006.01)

(52) U.S. Cl. .................. 156/275.7; 522/96; 522/103; 522/172; 528/55; 528/67; 528/28

(58) Field of Classification Search .................. 522/174, 522/96, 103, 172; 528/26, 28, 55, 67; 156/275.7
See application file for complete search history.

(56) References Cited

U.S. PATENT DOCUMENTS

| | | | |
|---|---|---|---|
| 3,453,243 | A | 7/1969 | Hartlein |
| 4,623,709 | A | 11/1986 | Bauriedel |
| 4,946,889 | A | 8/1990 | Nishioka |
| 5,312,943 | A * | 5/1994 | Gaglani .................. 556/414 |
| 5,478,427 | A | 12/1995 | Huver et al. |
| 5,696,179 | A * | 12/1997 | Chawla .................. 522/90 |
| 5,998,538 | A | 12/1999 | Meckel et al. |
| 6,166,127 | A | 12/2000 | Tomko |
| 6,183,658 | B1 | 2/2001 | Lesniak et al. |
| 6,599,955 | B1 * | 7/2003 | Weikard et al. .............. 522/90 |
| 6,784,242 | B2 | 8/2004 | Huebener et al. |
| 6,787,585 | B2 | 9/2004 | Rose et al. |
| 6,790,485 | B2 | 9/2004 | Baumbach et al. |
| 6,903,145 | B2 * | 6/2005 | Nienhaus et al. ............. 522/174 |
| 7,037,972 | B2 * | 5/2006 | Nienhaus et al. ............. 524/507 |
| 7,098,257 | B2 * | 8/2006 | Rink et al. ................. 522/126 |

2005/0228096 A1 10/2005 Kirsten et al.

FOREIGN PATENT DOCUMENTS

| | | |
|---|---|---|
| CA | 2 050 034 | 3/1992 |
| CA | 2 392 960 | 6/2001 |
| DE | 41 28 743 A1 | 3/1992 |
| DE | 40 41 753 A1 | 6/1992 |
| DE | 41 36 490 A1 | 5/1993 |
| DE | 100 44 216 A1 | 5/2002 |
| EP | 0 150 444 A2 | 8/1985 |
| EP | 0 590 398 A1 | 4/1994 |
| EP | 0 906 944 A2 | 4/1999 |
| EP | 1 138 476 A1 | 10/2001 |
| JP | 03-014879 | 1/1991 |
| WO | WO 97/46603 A1 | 12/1997 |
| WO | WO 99/24486 A1 | 5/1999 |
| WO | WO 99/64529 A1 | 12/1999 |
| WO | WO 00/29456 A1 | 5/2000 |
| WO | WO 01/16244 A1 | 3/2001 |
| WO | WO 01/40342 A1 | 6/2001 |
| WO | WO 02/26908 A1 | 4/2002 |
| WO | WO 02/36657 A1 | 5/2002 |

OTHER PUBLICATIONS

Derwent Publications Ltd.London GB; AN 1991-068064, XP002307556, "Coating Composition for plastic lens—comprises e.g. polyfunctional acrylate monomer, silica, silane and epoxy cpd" for JP 03-014879 (1991).

Derwent Publications Ltd. London, GB; AN 1991-068064, XP002307556, "Coating Composition for plastic lens —comprises e.g. polyfunctional acrylate monomer, silica, silane and epoxy cpd" for JP 03-014879 (1991).

Von Jürgen Delventhal, "Elgenschaften und Anwendungsbereiche coextrudierter Barrierefolien für Die Verpackung", Technisch-wissenschaftliche Beliage, Jahrgang 42, Nr. 3, pp. 19-23 (1991).

* cited by examiner

*Primary Examiner*—Susan W Berman
(74) *Attorney, Agent, or Firm*—Woodcock Washburn LLP

(57) ABSTRACT

Binding agents having barrier properties are provided which contain: a) a compound having at least one NCO group and at least one reactive functional group, which can be cured by radiation and which serves as component (A), and; b) a silicon-organic compound serving as component (B) with at least one NCO group and at least one functional group of formula (I): $-Si(Z)_n(X)_{3-n}$, in which Z represents $C_1$-$C_{18}$alkyl group, preferably $C_1$-$C_4$alkyl group; X represents $-NH_2$; $-NH-CO-R$; $-OOC-R$; $-O-N=C(R)_2$ or OR'; R represents a linear or branched, saturated or unsaturated $C_1$-$C_{18}$alkyl radical; R' represents R, an oxyalkylene radical having up to 4 carbon atoms, a $C_5$-$C_8$ cycloalkyl radical; a $C_6$-$C_{10}$ aryl radical or a C7-$C_{12}$ aralkyl radical; and n equals 0, 1 or 2. The binding agent can be used as a radiation curable binding agent in coating agents, fillers, sealants or adhesives, for example in the preparation of laminated films having barrier properties.

15 Claims, No Drawings

BINDING AGENTS HAVING BARRIER PROPERTIES

CROSS-REFERENCE TO RELATED APPLICATIONS

This application is a continuation under 35 USC Sections 365(c) and 120 of International Application No. PCT/EP2004/010381, filed 16 Sep. 2004 and published 14 Apr. 2005 as WO 2005/033240, which claims priority from German Application No. 10344448.3 filed 25 Sep. 2003, each of which is incorporated herein by reference in its entirety.

FIELD OF THE INVENTION

The invention relates to binding agents (hereinafter "binders") having barrier properties, to their use for adhesive bonding, coating, and sealing, to a process for producing composite materials using the barrier-property binders of the invention, and to the use of these composite materials for packaging.

DISCUSSION OF THE RELATED ART

For their transport or storage, numerous products require protection from the ambient air or the surrounding atmosphere; others, particularly those with a high water content, must be protected from drying out. They must therefore be packaged in a way suitable for keeping out completely, or almost completely, all or certain constituents of the surrounding atmosphere, or from preventing the diffusion of water or of flavors into the surrounding atmosphere and hence the drying or alteration in taste of the packaged product. Whereas these purposes are served in respect of motor fuels and heating fuels, for example, by their transport and storage in appropriate containers, an approach frequently taken in the field of medical administration (drugs, ampoules) and in the food/tobacco industry is to use flexible forms of packaging. One particularly critical constituent of the surrounding atmosphere is oxygen. In the case of many packed products, such as foods or drugs, the presence of oxygen can lead to oxidative spoiling or to the growth of microorganisms, which may likewise spoil the packaged product.

For the production of flexible packaging there is extensive use of polymer films, comprising thermoplastic films. These polymer films or sheets are commonly produced by simple shaping methods such as extrusion or blowmolding.

Since it is not possible to satisfy the entire spectrum of requirements imposed on a modern packaging film by means of one polymer film made of a single polymer, the step was taken some time ago to produce what are called composite films, i.e., films having a multilayer construction. In order to obtain the essential basic qualities of a packaging film, such as tensile strength, taste neutrality, and barrier properties, a variety of methods are used for joining the individual film constituents to form a composite film.

By way of example, multilayer systems with separate barrier layers are constructed by combining polyvinylidene chloride (PVDC) films, ethylene-vinyl alcohol (EVOH) films and/or aluminum foils with polyethylene films, polyester films and/or polyvinyl chloride films. These multilayer systems can be constructed either by coextrusion or by adhesively bonding separately produced films together.

In another method, packaging films, based for example on polyethylene terephthalate or on biaxially oriented polypropylene, are vapor-coated (under vacuum) with a layer of aluminum and/or silicon oxide.

Another known method utilizes the surface enhancement of the flexible packaging films by coating of the films with solvent-based or water-based polyvinylidene chloride solutions or dispersions. The adhesion of coating materials and adhesives based on PVDC or EVOH to polyolefin films is frequently inadequate. Assemblies of polyolefin films made using such adhesives can be separated even by hand. If appropriate, therefore, it is necessary to apply a primer, in an upstream step of the method, in order to produce effective adhesion of the surface coating or adhesive to the substrate film.

These known methods of producing packaging/composite materials having good barrier properties are generally very involved and cost-intensive. Again and again in practice, the use of metal layers, either by vapor application of metal or by lamination with metal foils, leads to defects, as a result of a multiplicity of fine holes in the metal layer, which considerably detract from the otherwise good barrier effect of the metal layer.

In the search for simpler methods, adhesives were developed which not only have the required adhesive effect but also have barrier effects with respect to oxygen, flavors, and water vapor.

EP 0906944 A2 discloses solvent-free polyurethane adhesives with barrier properties with respect to oxygen and moisture. These polyurethane adhesives are obtainable by reacting a linear diol with a linear polyester to give a crystalline, hydroxyl-terminated polyester, which is reacted with a liquid diisocyanate in an NCO/OH ratio of between about 1 and about 1.1. The polyurethane adhesives thus obtained are used as laminating adhesives. One disadvantage is that this kind of coating materials frequently lacks the desired flexibility. A further disadvantage is that long reaction times are needed in order to obtain high barrier properties.

WO 02/26908 describes laminating adhesive compositions based on polymeric binders, based in particular on one- or two-component polyurethane adhesives, comprising, in the binder matrix, filling elements with a platelet like crystallite structure and with aspect ratios >100. The laminating adhesives exhibit considerable reduction in the rate of oxygen transmission. The filling elements are dispersed, for example, into the hydroxyl-containing component of the two-component adhesive. Sedimentation of the filling elements after prolonged storage cannot be entirely ruled out, and in the case of subsequent application this may lead to a reduced or uneven barrier effect on the part of the adhesive. For certain applications, moreover, the cure rate may be too low.

BRIEF SUMMARY OF THE INVENTION

The present invention is based on the object of improving the processing and service properties of binders having barrier properties. A further object of the invention was to provide binders having barrier properties, particularly with respect to $CO_2$, $O_2$, $N_2$, water vapor, and flavors, which can be applied at low temperatures, in other words at about 30° C. to about 160° C., preferably about 40° C. to 120° C., and which exhibit effective initial adhesion. The binders ought in particular to be suitable as laminating adhesives for food packaging.

In the context of use of the binders as a sealant or filler, the contraction during the curing operation ought to be extremely low. In use, for example, for coating or as an adhesive, the intention is that the adhesion to surfaces which are difficult to wet should be improved.

The present invention provides a binder having barrier properties and comprising a) a compound containing at least one NCO group and at least one radiation-curable reactive functional group, as component (A), and b) an organosilicon compound as component (B), containing at least one NCO group and at least one functional group of the formula (I):

  (I)

Z=$C_1$-$C_{18}$alkyl group, preferably $C_1$-$C_4$alkyl group;

X=—$NH_2$; —NH—CO—R; —OOC—R; —O—N=C(R)$_2$ or OR';

R=a linear or branched, saturated or unsaturated $C_1$-$C_{18}$alkyl radical, preferably a methyl, ethyl, propyl or isopropyl radical;

R'=R, preferably a methyl, ethyl, propyl or isopropyl radical; or an oxyalkylene radical having up to 4 carbon atoms, preferably —($CH_2$—$CH_2$—O)$_m$—H and/or ($CH_2$—CH($CH_3$)—O)$_m$—H; a $C_5$-$C_8$cycloalkyl radical; a $C_6$-$C_{10}$aryl radical or a $C_7$-$C_{12}$aralkyl radical;

m=1 to 40, preferably 1 to 20, more preferably 1 to 10;

n=0, 1, or 2.

The use of the inventive binder having barrier properties with respect to $CO_2$, $O_2$, $N_2$, water vapor, and flavors as a sealant or adhesive reduces the number of production steps for producing composite materials having barrier properties, since additional coatings with polyvinylidene chloride and/or ethylene-vinyl alcohol layers, or vapor deposition of aluminum layers, are no longer necessary in order to achieve these barrier properties. The absence of a metal layer makes the composite materials more homogenous and therefore easier to dispose of.

The binders of the invention have a viscosity at 70° C. of 100 mPa·s to 26 000 mPa·s (measured in accordance with Brookfield, Digital Viscometer RVT DV-II, spindle 27) and therefore can be applied effectively at low temperatures, i.e., in a range from 40° C. to 120° C., and quickly exhibit effective initial adhesion. Consequently, temperature-sensitive substrates, polyolefin films for example, can be reliably bonded without damage to the substrate.

The binder of the invention is radiation-curable and is used as a dual cure system. The feature of dual cure systems is that they are both radiation-curable and curable by means of a second, independent curing mechanism.

Binders for the purposes of the present invention are substances which are able to join like or different substrates or to firmly attach thereto themselves. The "curing" (or "hardening") of a composition containing reactive functional groups derives in general from a polymerization, which goes hand in hand with an increase in the molecular weight of the compounds present in the composition. Customarily, however, crosslinking reactions take place at the same time, as well.

The terms "curing" (or "hardening", or similar terms) refer in the context of the present specification to polymerizations such as may take place within individual components of the composition under consideration in connection with the term in each case. The polymerization may be a free-radical, anionic or cationic addition polymerization, polycondensation or polyaddition, in which one reactive functional group is able to react with a suitable further functional group, thereby increasing the molecular weight of the molecule that carries it. An example of this is the radiation-induced addition polymerization of a component that carries double bonds.

The terms likewise refer to polymerizations such as may take place among various components of the composition under consideration in each case, one example being the polyaddition of a component that carries isocyanate groups with a component that carries OH groups. The terms further refer to polymerizations such as may occur between a component of the composition under consideration and a component which enters the composition as a result of an external influence, one example being the reaction between isocyanate groups and atmospheric moisture.

The feature "radiation-curable" refers in the context of the present invention to the triggering of a polymerization under the influence of radiation. Radiation in this context is to be understood as encompassing any kind of radiation which brings about irreversible crosslinking in the crosslinkable binder film subject to irradiation. Suitability is possessed in particular by UV radiation, electron beams, and visible light, but also IR radiation.

Molecular weight figures given for polymeric compounds refer, unless otherwise indicated, to the number-average molecular weight ($M_n$). All molecular weight figures, unless indicated otherwise, refer to values such as are obtainable by means of gel permeation chromatography (GPC).

Component (A) is obtainable by reacting polyisocyanates with compounds containing not only at least one NCO-reactive group but also at least one reactive functional group which is radiation-curable. Suitable polyisocyanates are aliphatic, aromatic and/or alicyclic isocyanates having two or more, preferably two up to a maximum of about four, isocyanate groups. Particular preference is given in the context of the present invention to using monomeric polyisocyanates, especially monomeric diisocyanates. Examples of suitable monomeric polyisocyanates are as follows: 1,5-naphthylene diisocyanate, 2,2'-, 2,4- and/or 4,4'-diphenylmethane diisocyanate (MDI), hydrogenated MDI ($H_{12}$MDI), allophanates of MDI, xylylene diisocyanate (XDI), tetramethylxylylene diisocyanate (TMXDI), 4,4'-diphenyldimethylmethane diisocyanate, di- and tetraalkylenediphenylmethane diisocyanate, 4,4'-dibenzyl diisocyanate, 1,3-phenylene diisocyanate, 1,4-phenylene diisocyanate, the isomers of tolylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4'-diisocyanatophenylperfluoroethane, tetramethoxybutane 1,4-diisocyanate, butane 1,4-diisocyanate, hexane 1,6-diisocyanate (HDI), dicyclohexylmethane diisocyanate, cyclohexane 1,4-diisocyanate, ethylene diisocyanate, bisisocyanatoethyl phthalate, and, additionally, diisocyanates containing reactive halogen atoms, such as 1-chloromethylphenyl 2,4-diisocyanate, 1-bromomethylphenyl 2,6-diisocyanate, 3,3-bis-chloromethyl ether 4,4'-diphenyl diisocyanate, or sulfur-containing polyisocyanates.

Sulfur-containing polyisocyanates are obtained for example by reacting 2 mol of hexamethylene diisocyanate with 1 mol of thiodiglycol or dihydroxydihexyl sulfide. Further useful diisocyanates are, for example, trimethylhexamethylene diisocyanate, 1,4-diisocyanatobutane, 1,12-diisocyanatododecane, and dimer fatty acid diisocyanate. Particular suitability is possessed by the following: tetramethylene, hexamethylene, undecane, dodecamethylene, 2,2,4-dimethylhexane, 2,3,3-trimethylhexamethylene, 1,3-cyclohexane, 1,4-cyclohexane, 1,3- and 1,4-tetramethylxylene, isophorone, 4,4-dicyclohexylmethane, and lysine ester diisocyanate.

In one particularly preferred embodiment of the invention the polyisocyanate used is 1-isocyanatomethyl-3-isocyanato-1,5,5-trimethylcyclohexane (IPDI), tetramethylxylylene diisocyanate (TMXDI), 2,2'-, 2,4'- and/or 4,4'-diphenylmethane diisocyanate (MDI) or mixtures thereof.

In one particular embodiment use is made of mixtures of polyisocyanates, a mixture comprising at least one polyisocyanate with a uretdione, isocyanurate, allophanate, biuret, iminooxathiazinedione and/or oxadiazinetrione structure. Particular preference is given to polyisocyanates or polyisocyanate mixtures with an allophanate structure, based on HDI, IPDI and/or 2,4'- or 4,4'-diisocyanatodicyclohexylmethane. Polyisocyanates containing oxadiazinetrione groups can be prepared from diisocyanate and carbon dioxide.

Suitable isocyanates having a functionality of at least three are polyisocyanates which come about through trimerization or oligomerization of diisocyanates or through reaction of diisocyanates with polyfunctional hydroxyl- or amino-containing compounds. Isocyanates suitable for preparing trimers are the diisocyanates already mentioned above, particular preference being given to the trimerization products of the isocyanates HDI, MDI, TDI or IPDI. Further suitable triisocyanates include adducts of diisocyanates and low molecular weight triols, especially the adducts of aromatic diisocyanates and triols such as trimethylolpropane or glycerol, for example. Likewise suitable for use are the polymeric isocyanates of the kind obtained, for example, as a bottom-product residue in the distillation of diisocyanates. Particularly suitable in this context is the polymeric MDI of the kind obtainable from the distillation residue in the distillation of MDI.

Particular preference is given in the context of the invention to using polyurethane prepolymers containing free NCO groups, particularly what are called "NCO-terminated polyurethane prepolymers", as polyisocyanates. Polyurethane prepolymers containing free NCO groups are obtainable by reacting polyols with monomeric polyisocyanates, the monomeric polyisocyanate being used in excess.

A polyol is a polyfunctional alcohol, i.e., a compound having more than one OH group in the molecule. In addition to this, the polyol may include further functional groups, sulfo groups for example.

There are a multiplicity of polyols that can be used. Examples are aliphatic polyols having 2 to 4 OH groups per molecule. The OH groups may be attached both primarily and secondarily. The suitable aliphatic polyols include, for example, ethylene glycol, propane-1,2-diol, propane-1,3-diol, butane-1,4-diol, butane-1,3-diol, butane-2,3-diol, butene-1,4-diol, butyne-1,4-diol, pentane-1,5-diol, and also the isomeric pentanediols, pentenediols or pentynediols or mixtures of two or more thereof, hexane-1,6-diol, and also the isomeric hexanediols, hexenediols or hexynediols or mixtures of two or more thereof, heptane-1,7-diol and also the isomeric heptane-, heptene- or heptynediols, octane-1,8-diol and also the isomeric octane-, octene- or octynediols, and the higher homologues or isomers of the stated compounds, such as arise for the skilled worker from a stepwise extension of the hydrocarbon chain by one $CH_2$ group in each case, or with introduction of branches into the carbon chain, or mixtures of two or more thereof.

Likewise suitable are higher polyfunctional alcohols such as, for example, glycerol, trimethylolpropane, pentaerythritol or sugar alcohols such as sorbitol or glucose, and also oligomeric ethers of the aforementioned substances with themselves or in a mixture of two or more of the stated compounds with one another, an example being polyglycerol having a degree of polymerization of approximately 2 to approximately 4.

Among the polyols, particular importance is possessed by polyester polyols, polyether polyols, polyether polyols modified by vinyl polymers, polyester polyether polyols, polycaprolactone polyols or polytetramethylene polyols.

Polyester polyols, for example, are generally obtained by reacting polyfunctional alcohols with polyfunctional carboxylic acids.

As a polyol it is additionally possible to employ polyether polyols. Polyether polyols are obtained preferably by reacting low molecular weight polyols with alkylene oxides. The alkylene oxides have preferably two to about four carbon atoms. Suitable examples are the reaction products of ethylene glycol, propylene glycol, the isomeric butanediols or hexanediols, as mentioned above, or mixtures of two or more thereof, with ethylene oxide, propylene oxide or butylene oxide or mixtures of two or more of these. Also suitable, furthermore, are the reaction products of polyfunctional alcohols such as glycerol, trimethylolethane or trimethylolpropane, pentaerythritol or sugar alcohols, or mixtures of two or more thereof, with the stated alkylene oxides, forming polyether polyols.

Preference for the purposes of the invention is given to polyurethane prepolymers containing free NCO groups and based on polyester polyols or polyether polyols. A particularly suitable polyol for use in the context of the present invention is a polyether polyol and/or polyester polyol having a molar mass of 200 to 10 000, preferably of 200 to 6000 g/mol, more preferably 200 to 4000 g/mol, or a mixture of polyether polyols and/or polyester polyols which meet the restricting criterion of the molar mass. Further information on the broad spectrum of suitable polyol and isocyanate components, chain extenders which can be used where appropriate, and processes for preparing polyurethane prepolymers can be taken by the skilled worker from the relevant technical and patent literature on polyurethane prepolymers, examples of which are EP 150444, EP 0 590 398 A1, and WO 99/24486.

To prepare the organic compound (A) it is preferred to employ a low-monomer polyurethane prepolymer; in the context of the present invention, "low-monomer" refers to a low concentration of the monomeric diisocyanates in the PU prepolymer containing free NCO groups. The concentration of these so-called residual monomers is below 1% by weight, preferably between 0 and 0.5% by weight, more preferably between 0 and 0.2% by weight, based on the composition of the PU prepolymer containing free NCO groups.

Low-monomer PU prepolymers containing free NCO groups are known, for example, from DE 4136490, WO 01/40342, and WO 97/46603, and are explicitly subject matter of this invention.

In one preferred embodiment of the invention, polyisocyanates used are monomeric polyisocyanates from the group of 1,5-naphthalene diisocyanate, 2,2'-, 2, 4'- and/or 4,4'-diphenylmethane diisocyanate (MDI), the isomers of tolylenediisocyanate (TDI), 1-isocyanatomethyl-3-isocyanato-1,5,5-trimethylcyclohexane (IPDI), hexane 1,6-diisocyanate (H DI), tetramethylxylylene d iisocyanate (TMXDI), trimerization products of the isocyanates HDI, MDI, TDI or IPDI; and NCO-terminated polyurethane prepolymers based on HDI, MDI, TDI or IPDI; and mixtures thereof.

In order to obtain component (A), the polyisocyanates are reacted with compounds containing not only at least one NCO-reactive functional group but also at least one radiation-curable reactive functional group.

The NCO-reactive functional group is a group which has an active hydrogen atom which is attached to a nitrogen, oxygen or sulfur atom and can be determined by the Zerewittinoff test. This includes in particular the hydrogen atoms of water, carboxyl, amino, imino, hydroxyl, and thiol groups.

A radiation-curable reactive functional group is, for example, a group having a carbon-carbon double bond.

Examples of compounds which can be employed are polyacrylates, polyesters, polyethers, polycarbonates, polyacetals, polyurethanes, polyolefins, or rubber polymers such as nitrile rubber or styrene/butadiene rubber, provided they contain at least one acidic hydrogen atom and at least one functional group which is reactive through irradiation preferably with UV light or with electron beams.

In the preferred embodiment the compound used as component (A) contains at least one free NCO group and at least one (meth)acrylic group. For the preparation of component (A) it is preferred to use derivatives of acrylic acid, examples being the acrylates and the methacrylates, for the reaction with the polyisocyanate. Useful compounds are poly(meth)acrylates, polyester (meth)acrylates, epoxy(meth)acrylates or polyurethane(meth)acrylates. "(Meth)acrylate" is intended in the text below to denote an abbreviated way of writing "acrylate and/or methacrylate".

Component (A) is preferably a reaction product of at least one polyisocyanate with at least one (meth)acrylate of the general formula $$H_2C=CR^1-C(=O)-O-R^2-Y \qquad (II)$$

where

Y=an NCO-reactive group, preferably OH, COOH, SH, $NH_2$, $NHR^3$;

$R^1$=H, $CH_3$;

$R^2$=saturated or unsaturated linear or branched alkylene group having 2 to 21 carbon atoms and substituted, if appropriate, by functional groups, for example a phenoxy group or acetoxy group; preferably 2 to 6 carbon atoms, in particular an ethylene, propylene, isopropylene, n-butylene, isobutylene group, or a C2-C4 alkylene oxide group, preferably an ethylene oxide and/or propylene oxide group, more preferably an ethylene oxide group having 2 to 10 ethylene oxide units and/or a propylene oxide group having 1 to 7 propylene oxide units;

$R^3$=linear or branched, saturated or unsaturated $C_1$-$C_{18}$ alkyl radical; $C_5$-$C_8$ cycloalkyl, $C_6$-$C_{10}$ aryl, $C_7$-$C_{12}$ aralkyl.

The preparation of (meth)acrylates (II) of this kind is known to the skilled worker.

Preferred (meth)acrylates (II) used are hydroxyl (meth)acrylates (Y=OH), examples being the following: 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 6-hydroxyhexyl acrylate, 6-hydroxyhexyl methacrylate, polyethylene glycol acrylate, polyethylene glycol methacrylate, polypropylene glycol acrylate, and polypropylene glycol methacrylate, glycerol mono(meth)acrylate, 1,3-glycerol di(meth)acrylate, 3-phenoxy-2-hydroxypropyl(meth)acrylate, 3-tolyloxy-2-hydroxypropyl(meth)acrylate, 3-acetoxy-2-hydroxypropyl(meth)acrylate, 2-hydroxy-3-[(2-methyl-1-oxo-2-propenyl)oxy]propyl ester of 4-hydroxybenzoic acid, 2-hydroxybutyl(meth)acrylate, 3-hydroxybutyl(meth)acrylate, 4-hydroxybutyl(meth)acrylate, 6-hydroxyhexyl(meth)acrylate.

The hydroxyl acrylates or methacrylates are used here individually or in a mixture.

The amounts of polyisocyanates and (meth)acrylate of the general formula (II) can be selected within a broad range. Thus the ratio of NCO group of the polyisocyanate to NCO-reactive group Y of the (meth)acrylate of the general formula (II) can be between 0.6:1 to 20:1. The NCO:Y ratio is preferably 1.2:1 to 10:1.

The molar mass (molecular weight) of component (A) is between 100 g/mol and 10,000 g/mol, preferably between 110 g/mol and 6000 g/mol, and more preferably between 120 g/mol and 4000 g/mol. The NCO value of component (A) is between 2% and 30% by weight, preferably between 5% and 25% by weight (determined by the method of Spiegelberger).

The organosilicon compound which can be used as component (B), containing at least one NCO group and at least one functional group of the formula $Si(Z)_n(X)_{3-n}$(I), is obtainable by reacting at least one polyisocyanate with at least one organosilicon compound of the formula (III):

$$Y^1-A-Si(Z)_n(X)_{3-n} \qquad (III)$$

where $Y^1$=an NCO-reactive group, preferably an —OH, —COOH, —SH, —$NH_2$, NHR" group;

R" =linear or branched, saturated or unsaturated $C_1$-$C_{18}$alkyl; $C_5$-$C_8$cycloalkyl, $C_6$-$C_{10}$aryl, $C_7$-$C_{12}$ aralkyl radical; oxyalkylene radical having up to 4 carbon atoms, preferably —$(CH_2-CH_2-O)_m$—H and/or $(CH_2-CH(CH_3)-O)_m$—H; A—$Si((Z)_n)(X)_{3-n}$; an alkyl-, cycloalkyl- or aryl-substituted siloxane radical containing about 1 to about 20 silicon atoms;

A=a linear or branched, saturated or unsaturated alkylene group having 1 to 12 carbon atoms, preferably a linear or branched alkylene group having 1 to 4 carbon atoms;

Z=$C_1$-$C_{18}$alkyl group, preferably $C_1$-$C_4$alkyl group;

X=—$NH_2$; —NH—CO—R; —OOC—R; —O—N=C$(R)_2$ or OR";

R=a linear or branched, saturated or unsaturated $C_1$-$C_{18}$alkyl radical, preferably a methyl, ethyl, propyl or isopropyl radical;

R"=R, preferably a methyl, ethyl, propyl or isopropyl radical; or an oxyalkylene radical having up to 4 carbon atoms, preferably —$(CH_2-CH_2-O)_m$—H and/or $(CH_2-CH(CH_3)-O)_m$—H; a $C_5$-$C_8$cycloalkyl radical; a $C_6$-$C_{10}$aryl radical or a $C_7$-$C_{12}$aralkyl radical;

m=1 to 40, preferably 1 to 20, more preferably 1 to 10;

n=0, 1, or 2.

Examples of compounds of the formula (III) are $H_2N$—$CH_2$—Si(O—$CH_2$—$CH_3$)$_3$, HO—$CH_2$—Si(OCH$_3$)$_3$, HO—$(CH_2)_3$—O—$CH_2$—Si(O—$CH_3$)$_3$, HO—$CH_2$—$CH_2$—O—$CH_2$—Si(OCH$_3$)$_3$, (HO—$C_2H_4$)$_2$N—$CH_2$—Si(O—$CH_3$)$_3$, HO—$(C_2H_4$—O)$_3$—$C_2H_4$—N(CH$_3$)—$CH_2$—Si (O—$CH_3$)$_3$, $H_2N$—$CH_2$—$C_6H_4$—$CH_2$—NH—$CH_2$—Si (O—$CH_3$)$_3$, HS—$CH_2$—Si(O—$CH_3$)$_3$, $H_2N$—$(CH_2)_3$—NH—$CH_2$—Si(OCH$_3$)$_3$, $H_2N$—$CH_2$—$CH_2$—NH—$CH_2$—Si(O—$CH_3$)$_3$, HN—((CH$_2$)$_3$—Si(O—$CH_2$—$CH_3$)$_3$)$_2$, or $CH_3$—$(CH_2)_3$—NH—$(CH_2)_3$—Si(O—$CH_3$)$_3$, $H_2N$—$(CH_2)_3$ —Si(O—$C_2H_5$)$_3$, $H_2N$—CH(CH$_3$)—$CH_2$—Si(O—CH$_3$)$_3$, $H_2N$—$(CH_2)_3$—Si(O—CH$_3$)$_3$, $H_2N$—$CH_2$—$CH_2$—O—$CH_2$—$CH_2$—Si(O—CH$_3$)$_3$, (HO—$C_2H_4$)$_2$N—$(CH_2)_3$—Si(O—CH$_3$)$_3$, HO—$(C_2H_4$—O)$_3$—$C_2H_4$—N(CH$_3$)—$(CH_2)_3$ —Si(O—$C_4H_9$)$_3$, $H_2N$—$CH_2$—$C_6H_4$—$CH_2$—$CH_2$—Si(O—CH$_3$)$_3$, $H_2N$—$(CH_2)_3$—NH—$(CH_2)_3$—Si (O—CH$_3$)$_3$, $H_2N$—$CH_2$—$CH_2$—NH—$(CH_2)_2$—Si (OCH$_3$)$_3$, $H_2N$—$(CH_2)_2$—NH—$(CH_2)_3$—Si(O—CH$_3$)$_3$, $H_2N$—CH($C_2H_5$)—$CH_2$—Si(O—CH$_3$)$_3$, $H_2N$—$CH_2$—$CH_2$—O—$CH_2$—$CH_2$—Si(O—$C_2H_5$)$_3$, (HO—$C_2H_4$)$_2$N—$(CH_2)_3$—Si(O—$C_2H_5$)$_3$, $H_2N$—$CH_2$—$C_2H_4$—$CH_2$—$CH_2$—Si(O—$C_2H_5$)$_3$, $H_2N$—$(CH_2)_3$—NH—$(CH_2)_3$—Si (O—$C_2H_5$)$_3$, $H_2N$—$CH_2$—$CH_2$—NH—$(CH_2)_2$—Si(O—$C_2H_5$)$_3$, $H_2N$—$(CH_2)_2$—NH—$(CH_2)_3$—Si(O—$C_2H_5$)$_3$, and mixtures of two or more thereof.

In the context of the present invention the organosilicon compound of the formula (III) used for preparing the organosilicon compound (B) is preferably 3-aminopropyltrimethoxysilane, 3-aminopropyldimethoxymethylsilane, 3-aminopropyltriethoxysilane, 3-aminopropyldimethoxyphenylsilane, and 3-aminopropyldiethoxyethylsilane, especially 3-aminopropyltrimethoxysilane or bis(3-triethoxysilylpropyl)amine, or mixtures thereof.

Commercially available silanes are supplied by Dynamit Nobel under the name DYNASYLAN®. These are alkoxysilane derivatives having two or three alkoxy radicals and one or two alkyl radicals, to which functional groups may also be attached, additionally, examples being amino, mercapto, methacryloyloxy or a nitrile group, or a halogen radical such as chlorine.

Polyisocyanates used for preparing component (B) are the same polyisocyanates already described in connection with the preparation of component (A). Preference is given to using polyisocyanates from the group of the monomeric diisocyanates, and the polyisocyanate is selected in particular from the following group: 2,4'- and/or 4,4'-diphenylmethane diisocyanate (MDI), isophorone diisocyanate (IPDI), hexamethylene diisocyanate (HDI), tetramethylxylylene diisocyanate (TMXDI), the isomers of tolylene diisocyanate (TDI), and mixtures thereof.

To prepare component (B) it is possible to use both mixtures of polyisocyanates and/or mixtures of the organosilicon compound (III).

The polyisocyanate component is reacted with the organosilicon compound (III) in a molar NCO/Y ratio of 1:0.01 to 1, preferably of 1:0.05 to 0.7, and more preferably of 1:0.1 to 0.4.

Component (B) of the binder of the invention has an NCO value of 1-30%, preferably 10-28%, more preferably 15-25%, as determined by the method of Spiegelberger, and possesses a molar mass of 100 g/mol to 1000 g/mol.

The free NCO groups present in components (A) and (B) are able to react with moisture (water) or with other NCO-reactive compounds that possess an acidic hydrogen atom, and hence to bring about the formation of an organic network.

This form of reactivity makes it possible to bring the barrier-property binders of the invention to the desired site in the desired way in a processable state (in general, liquid to highly viscous) and to cure them by the addition of water or other compounds that possess an acidic hydrogen atom (referred to in this case as curing agents).

With these so-called 2K (two-component) systems, the curing agent is generally added immediately prior to application, with the processor having only a limited processing time available following the addition of curing agent. It is, however, likewise possible to cure the radiation-curable binder of the invention, containing the reactive NCO groups, without adding curing agents, solely through reaction with atmospheric moisture (1K (one-component) systems). Such 1K systems generally have the advantage over the 2K systems that the user is freed from the often burdensome mixing of the components, which are frequently viscous, prior to application. However, if rapid attainment of a defined ultimate strength, i.e., a high cure rate, is called for, in order for example to allow very rapid further processing of the bonded, coated or sealed materials, the curing rate based on curing by atmospheric moisture can be too slow. In these cases, 2K systems are preferred, and a curing agent (C) is added to the binder prior to processing.

The invention hence additionally provides a binder which has barrier properties and which, in the form of a 2K system, comprises as curing agent (C) 0 to 90% by weight, preferably 5% to 60% by weight of a compound having at least two functional groups each having at least one acidic hydrogen atom. The molar mass of (C) is situated within a range from 50 to 10 000 g/mol, preferably 50 to 6000 g/mol, and more preferably within a range from 50 to 3000 g/mol.

As curing agent (C) it is preferred to use a compound having at least two functional groups each having at least one acidic hydrogen atom, or a mixture of two or more such compounds, which are able to react with the NCO groups of (A) and (B).

Suitable functional groups having at least one acidic hydrogen atom and reactive with the corresponding NCO groups of (A) and (B) are, in particular, primary or secondary amino groups, mercapto groups or OH groups. The compounds that can be employed as curing agents (C) may contain amino groups, mercapto groups or OH groups, in each case exclusively, or in a mixture.

The functionality of the compounds that can be employed in the curing agent (C) is generally at least about two. The curing agent (C) preferably includes a fraction of compounds of higher functionality, having a functionality, for example, of three, four or more. The total (average) functionality of the curing agent (C) is, for example, about two (if, for example, only difunctional compounds are employed as curing agents (C)), or more—for example, about 2.1, 2.2, 2.5, 2.7, or 3. Where appropriate, the curing agent (C) may have an even higher functionality, about four or more for example. Preferably, the curing agent (C) comprises a polyol which carries at least two OH groups. Polyols suitable for use as curing agents (C) are those of this kind that have already been described in the present text.

The curing agent (C) is employed generally in an amount such that the ratio of functional groups of compounds (A) and (B) that are reactive with the curing agent (C) to groups of the curing agent (C) that are reactive with corresponding functional groups of the compounds (A) and (B) is about 5:1 to about 1:1, in particular about 2:1 to about 1:1.

The functional group —Si(X)$_{3-n}$ of formula (I) in the organosilicon compound used as component (B) that contains at least one NCO group is used to construct an inorganic network made up of Si—O—Si units.

When the binder of the invention is used as a one-component (1K) adhesive, component (B) is preferably sensitive to hydrolysis—that is, in the presence of water or atmospheric moisture, the Si—X bond is destroyed, with release of corresponding cleavage products and with simultaneous crosslinking. In accordance with the group X in formula (I), the cleavage products of the crosslinking, which proceeds as a polycondensation reaction, are amines, acid amides, oximes or alcohols, for example.

The course of formation of the Si—O—Si network can be investigated in this case by means, for example, of Karl-Fischer titration (determination of consumption of water during hydrolysis).

When the binder of the invention is used as a two-component (2K) adhesive, cleavage of the Si—X bond is brought about by addition of the curing agent. Preferred curing agents used are polyols, especially OH-terminated polyesters. If, for example, group X in formula (I) is an alkoxy group, preferably —OCH$_3$ or —OC$_2$H$_5$, the network comes about through alcoholysis or transetherification.

In one preferred embodiment of the invention the polycondensation or crosslinking reaction of component (B) takes place in the presence of a metal compound of the formula (IV):

$$MR^4_x \qquad (IV)$$

as component (D). The metal M in this compound is selected from elements of the main and transition groups of the Periodic Table that are able formally to exist in the 3 or 4 oxidation state. Preferably it is Ge, Sn, Pb, Ti, Zr, B or Al. Depending on valence, x is 3 or 4. The radical $R^4$, which may be identical or different, is selected from halogen, alkoxy, alkoxycarbonyl, and hydroxyl. Since numerous metal compounds having a formal oxidation state of 3 or 4 can also be present in the form of complexes with a multiplicity of ligands, however, the binder may instead or additionally include compounds in which some or all of the groups $R^4$ of the formula (IV) have been replaced by one or more ligands attached more strongly to the metal M than is the group $R^4$. Compounds of this kind are described for example in DE 10044216 A1 (p. 4, lines 1 to 31). Suitable metal compounds are also known under the heading "adhesion promoters" and represent one or more metal centers, such as Si, Ti, Zr or Al, which are attached to functional organic groups. Titanium, zirconium or aluminum compounds of this kind are described for example in DE 4128743 C2 on pages 7 and 8, r being 0 for the Zr and Ti compounds. Commercially, titanates are available from Kenrich Petrochemicals, Inc. under the designation "KR" or "LICA" substances. Similarly to the abovementioned silanes, these reagents are compounds containing alkoxy radicals and where appropriate, additionally, radicals which are substituted by functional groups and are attached to the metal center via oxygen. The functional groups are amino, mercapto or hydroxyl groups, for example. Suitable zirconate compounds are, for example, the compounds available as "KZ" or "LZ" reagents from Kenrich Petrochemicals, Inc., with amino or mercapto groups where appropriate. Component (D) is used in the binder of the invention at 0 to 12%, preferably 0.5% to 10%, and more preferably from 1% to 5% by weight, based on the total amount of (A) and (B) employed.

The binders of the invention, with barrier properties, are highly reactive binders which exhibit multistage curing.

A binder which exhibits multistage curing is a binder which in a first stage is subjected, by irradiation, to a rapid, initial curing reaction, so that the bonded, coated or sealed articles or materials can be handled without problems. In a second curing stage the binder then undergoes further curing until it has attained the desired ultimate strength. This methodological principle is described for example in DE 40 41 753 A1.

The first-stage irradiation may take place by UV rays, electron beams, visible light, or else IR radiation. In the case of electron beams or UV radiation the desired product properties are set via the radiation dose; in the case of IR radiation they are set via the product temperature and the residence time. The progress of photochemical curing can be investigated using IR spectroscopy (intensity and relation of the C=C and C=O bands).

In the context of the invention, irradiation with UV light or electron beams is preferred.

Where the radiation-curable binder of the invention, having barrier properties, is to be polymerized under UV irradiation, the binder composition includes at least one photoinitiator (E).

Preference is given to using a photoinitiator (E) which on irradiation with light with a wavelength of about 215 to about 480 nm is capable of initiating a free-radical polymerization of olefinically unsaturated double bonds. For the purposes of the present invention, photoinitiators suitable for use as (E) include in principle all commercially customary photoinitiators which are compatible with the binder of the invention, i.e., which produce at least largely homogeneous mixtures.

These are, for example, all Norrish type I fragmenting substances. Examples thereof are benzophenone, camphorquinone, QUANTACURE (manufacturer: International Bio-Synthetics), KAYACURE MPB (manufacturer: Nippon Kayaku), ESACURE BO (manufacturer: Fratelli Lamberti), TRIGONAL 14 (manufacturer: Akzo), photoinitiators of the Irgacure®, Darocure® or Speedcure® series (manufacturer: Ciba-Geigy), Darocure® 1173 and/or Fi4 (manufacturer: Eastman). Particular suitability among these is possessed by Irgacure® 651, Irgacure® 369, Irgacure® 184, Irgacure® 907, Irgacure® 1850, Irgacure® 1173 (Darocure® 1173), Irgacure® 1116, Speedcure® EDB, Speedcure® ITX, Irgacure® 784 or Irgacure® 2959, or mixtures of two or more of these. A further suitable candidate is 2,4,6-trimethylbenzenediphenylphosphine oxide (LUCIRIN TPO, manufacturer: BASF AG), which can also be employed as a mixture with one or more of the abovementioned photoinitiators.

The binder of the invention, having barrier properties, contains photoinitiator (E) in an amount of 0 to 15%, preferably 0.5% to 10%, more preferably 1% to 5%, by weight based on the total amount of the binder composition.

In another embodiment the radiation-curable binder of the invention, having barrier properties, may further comprise, as compound (F), a compound containing at least one and preferably two functional group(s) that are polymerizable by irradiation with UV light or with electron beams, but which does not contain any NCO group. As functional groups polymerizable by irradiation with UV light or with electron beams, compound (F) contains at least one group having an olefinically unsaturated double bond.

Particularly suitable compounds (F) are acrylate or methacrylate esters with a functionality of two or more. Such acrylate or methacrylate esters include, for example, esters of acrylic acid or methacrylic acid with aromatic, aliphatic or cycloaliphatic polyols, or acrylate esters of polyether alcohols. (Meth)acrylate esters of aliphatic polyols having 2 to about 40 carbon atoms include, for example, neopentyl glycol di(meth)acrylate, 1,6-hexanediol di(meth)acrylate, trimethylolpropanetri(meth)acrylate, pentaerythritoltetra(meth)acrylate, allyl(meth)acrylate, 2,3-isopropylideneglycerol (meth)acrylate, 2-acetamidoethyl(meth)acrylate, 2-benzamidoethyl (meth)acrylate, benzyl(meth)acrylate, phenylethyl(meth)acrylate, 2-phenoxyethyl(meth)acrylate, reaction product of methyloxazoline and methacrylic acid, morpholinoethyl (meth)acrylate, glycidyl(meth)acrylate, piperidylacrylamide, neopentyl(meth)acrylate, cyclohexyl(meth)acrylate, tert-butyl methacrylate, and tetrahydrofurfuryl(meth)acrylate, TEGDMA (tetraethylene glycol dimethacrylate), TEDMA (triethylene glycol dimethacrylate), bisphenol A bis (hydroxypropyl methacrylate), and also (meth)acrylate esters of sorbitol and of other sugar alcohols. These (meth)acrylate esters of aliphatic or cycloaliphatic diols may be modified with an aliphatic ester or an alkylene oxide. The acrylates modified by an aliphatic ester include, for example, neopentyl glycol hydroxypivalate di(meth)acrylate, caprolactone-modified neopentyl glycol hydroxypivalate di(meth)acrylates, and the like. The alkylene oxide-modified acrylate compounds include, for example, ethylene oxide-modified neopentyl glycol di(meth)acrylates, propylene oxide-modified neopentyl glycol di(meth)acrylates, ethylene-oxide modified 1,6-hexanediol di(meth)acrylates or propylene oxide-modified 1,6-hexanediol di(meth)acrylates, or mixtures of two or more thereof.

(Meth)acrylate monomers constructed on the basis of polyether polyols include, for example, neopentyl glycol-modified (meth)acrylates, trimethylolpropane di(meth)acrylates, polyethylene glycol di(meth)acrylates, polypropylene glycol di(meth)acrylates, and the like. Acrylate monomers with a functionality of three or more include, for example, trimethylolpropanetri(meth)acrylate, pentaerythritol tri- and tetra (meth)acrylate, dipentaerythritoltetra(meth)acrylate, dipentaerythritol penta(meth)acrylate, dipentaerythritol hexa(meth)acrylate, caprolactone-modified dipentaerythritol hexa(meth)acrylate, pentaerythritoltetra(meth)acrylate, tris[(meth)acryloyloxyethyl]isocyanurate, caprolactone-modified tris[(meth)acryloyloxyethyl]isocyanurates or trimethylolpropanetetra(meth)acrylate, or mixtures of two or more thereof.

Among the stated (meth)acrylate monomers with a functionality of two, three or more that can be used in accordance with the invention as component (F), preference is given to di-, tri-, and tetrapropylene glycol diacrylate, neopentyl glycol propoxylate di(meth)acrylate, trimethylolpropane tri(meth)acrylate, trimethylolpropane monoethoxytri(meth)acrylate, and pentaerythritol triacrylate.

(Meth)acrylate esters based on polyols containing urethane groups can be prepared by reacting the polyols with polyisocyanates, to form at least partly OH— terminated polyurethane prepolymers, which are esterified with (meth)acrylic acid to form the corresponding monoesters or diesters.

A "reactive diluent" which is particularly suitable as compound (F) includes those compounds which are fluid at room temperature, especially esters of acrylic acid or methacrylic acid. Examples of particularly suitable compounds are the acrylic or methacrylic esters of aromatic, cycloaliphatic, aliphatic, linear or branched $C_{4-20}$ monoalcohols or of corresponding ether alcohols, examples being n-butyl acrylate, 2-ethylhexyl acrylate, octyl/decyl acrylate, isobornyl acrylate, 3-methoxybutyl acrylate, 2-phenoxyethyl acrylate, benzyl acrylate or 2-methoxypropyl acrylate.

The molar mass of compound (F) is situated in the range from 100 to 15 000 g/mol, preferably from 100 to 10,000 g/mol, and more preferably from 100 to 8000 g/mol.

Where compound (F) is used, its fraction in the radiation-curable binder of the invention, having barrier properties, is up to about 80% by weight, but preferably below: about 40%, 30% or about 20% by weight, for example. The use of smaller amounts is likewise possible, and thus the radiation-curable binder of the invention, having barrier properties, may include only 10% by weight, or an amount from about 0.5% to about 8% by weight, of compound (F).

The binder of the invention may where appropriate include additives (G), which as a proportion of the total binder can have a fraction of up to about 50% by weight. The additives (G) which can be used in the context of the present invention include, for example, plasticizers, stabilizers, antioxidants, colorants or fillers.

Examples of plasticizers (G1) used are phthalic acid-based plasticizers, especially dialkyl phthalates, preferred phthalic ester plasticizers being those esterified with an alcohol having about 6 to about 14 carbon atoms. Particular preference is given in this context to diisononyl phthalate or diisotridecyl phthalate.

Likewise suitable as plasticizers are benzoate plasticizers, examples being sucrose benzoate, diethylene glycol dibenzoate and/or diethylene glycol benzoate, in which about 50% to about 95% of all the hydroxyl groups have been esterified; phosphate plasticizers, examples being tert-butylphenyl diphenyl phosphate; polyethylene glycols and their derivatives, examples being diphenyl ethers of poly(ethylene)glycol; liquid resin derivatives, examples being the methyl ester of hydrogenated resin; vegetable and animal oils, examples being glycerol esters of fatty acids, and polymerization products thereof.

Antioxidants or stabilizers which can be used as additives (G2) in the context of the invention include phenols, sterically hindered phenols of high molecular weight ($M_n$), polyfunctional phenols, sulfur- and phosphorus-containing phenols or amines. Examples of phenols useful as additives in the context of the invention include hydroquinone, hydroquinone monomethyl ether, 2,3-di-tert-butylhydroquinone, 1,3,5-trimethyl-2,4,6-tris(3,5-di-tert-butyl-4-hydroxybenzyl)benzene; butylated hydroxytoluene (BHT), pentaerythritol tetrakis-3-(3,5-di-tert-butyl-4-hydroxyphenyl)propionate, n-octadecyl(3,5-di-tert-butyl-4-hydroxyphenyl)propionate; 4,4-methylenebis(2,6-di-tert-butylphenol); 4,4-thiobis(6-tert-butyl-o-cresol); 2,6-di-tert-butylphenol; 2,6-di-tert-butyl-4-methylphenol; 6-(4-hydroxyphenoxy)-2,4-bis(n-octylthio)-1,3,5-triazine; di-n-octadecyl 3,5-di-tert-butyl-4-hydroxybenzylphosphonate; 2-(n-octylthio)ethyl 3,5-di-tert-butyl-4-hydroxybenzoate; and sorbitol hexa[3-(3,5-di-tert-butyl-4-hydroxyphenyl)propionate]; and also p-hydroxydiphenylamine or N,N'-diphenylenediamine or phenothiazine.

As an additive, the radiation-curable binder of the invention, having barrier properties, may include agents (G3) which improve the aging behavior of adhesive bonds, in particular, with respect to a humid atmosphere. Typical agents (G3) are, for example, ethylene/acrylamide copolymers or phosphorus derivatives. In the context of the invention it is preferred to use phosphorus derivatives of the kind disclosed in WO 99/64529 (page 7 line 14 to page 9 line 5), examples being 2-methacryloyloxyethyl phosphate and bis(2-methacryloyloxyethyl) phosphate, or mixtures thereof. Carboxylic acid-containing compounds can also be employed. Compounds of this kind are disclosed for example in WO 01/16244 (page 7 line 7 to page 8 line 31) or in WO 00/29456 (page 11 line 15 to page 12 line 2). Commercially available products can be obtained from, for example, UCB Chemicals, B-1620 Drogenbos, Belgium under the "EBECRYL" product class, e.g., EBECRYL 168 or EBECRYL 170.

Further additives (G4) can also be included in the radiation-curable binders of the invention, having barrier properties, the purpose of these additives being to vary particular properties. Examples may include colorants such as titanium dioxide, fillers such as talc, clay, and the like.

In the radiation-curable binders of the invention with barrier properties it is possible where appropriate for small amounts of thermoplastic nonreactive polymers (G5) to be present, examples being ethylene-vinyl acetate (EVA), ethylene-acrylic acid, ethylene-methacrylate, and ethylene-n-butyl acrylate copolymers, which where appropriate endow the binder with additional flexibility, toughness, and strength. It is likewise possible to add certain hydrophilic polymers (G6), examples being polyvinyl alcohol, hydroxyethylcellulose, hydroxypropylcellulose, polyvinyl methyl ether, polyethylene oxide, polyvinylpyrrolidone, polyethyloxazolines or starch or cellulose esters; especially the acetates having a degree of substitution of less than 2.5, which, for example, may enhance the wettability of the binder of the invention.

The binder of the invention, having barrier properties, preferably contains

I) 5% to 95%, preferably 20% to 90%, by weight of the compound containing at least one NCO group and at least one radiation-curable reactive functional group, as component (A), II) 5% to 95%, preferably 10% to 80%, by weight of the organosilicon compound containing at least one NCO group and at least one functional group of the formula (I), as component (B), III) 0 to 90%, preferably 5% to 60%, by weight of a curing agent as component (C), 0 to 12%, preferably 0.5% to 10%, more preferably 1% to 5% by weight of a metal compound of the formula (IV)

$$MR_x^4 \quad (IV)$$

where M=Ge, Sn, Pb, Ti, Zr, B, Al,
X=3 or 4,
R$^4$=halogen, hydroxyl, alkoxy, alkoxycarboxyl group, it being possible for the radical R to be identical or different, as component (D), IV) 0 to 15%, preferably 0.5% to 10%, more preferably 1% to 5% by weight of a photoinitiator as component (E), V) 0 to 80%, preferably 0.5% to 40%, by weight of an NCO-free compound containing at least one and preferably two functional group(s) which are polymerizable by irradiation with UV light or with electron beams, as component (F), VI) 0 to 50% by weight of additives selected from the group of plasticizers, stabilizers, antioxidants, colorants or fillers, as component (G), the sum of the stated constituents being 100% by weight.

In one particular embodiment of the invention the binder with barrier properties contains I) 15% to 95% by weight of component (A) as a reaction product of a low-monomer polyurethane prepolymer containing free NCO groups and at least one hydroxy acrylate from the group of 2-hydroxyethyl(meth)acrylate, 2-hydroxypropyl(meth)acrylate, 3-hydroxypropyl (meth)acrylate, and 6-hydroxyhexyl(meth)acrylate, the low-monomer polyurethane prepolymer being an adduct of
   a) at least one polyisocyanate from the group of IPDI, MDI or TDI; and
   b) at least one polyol having a molar mass of 150 g/mol to 2000 g/mol.

The low-monomer polyurethane prepolymer contains less than 0.5%, preferably less than 0.3%, and more preferably less than 0.1% by weight of free polyisocyanate from the group of IPDI, MDI or TDI, based on the total amount of PU prepolymer.

In a further preferred embodiment of the invention the binder with barrier properties contains II) 10% to 80% by weight of component (B) as a reaction product of
   a) at least one polyisocyanate from the group of hexamethylene diisocyanate, IPDI, MDI, TDI or an at least trifunctional polyisocyanate with
   b) a compound of the formula:

$$Y^1\text{—}A\text{—}Si(Z)_n(X)_{3-n} \quad (III)$$

where
Y$^1$=an NCO-reactive group, preferably an —OH, —COOH, —SH, —NH$_2$, NHR"group;
R"=linear or branched, saturated or unsaturated C$_1$-C$_{18}$alkyl; C$_5$-C$_8$cycloalkyl, C6-C$_{10}$aryl, C$_7$-C$_{12}$aralkyl radical; oxyalkylene radical having up to 4 carbon atoms, preferably —(CH$_2$—CH$_2$—O)$_m$—H and/or (CH$_2$—CH(CH$_3$)—O)$_m$—H; A—Si((Z)$_n$)(X)$_{3-n}$an alkyl-, cycloalkyl- or aryl-substituted siloxane radical containing about 1 to about 20 silicon atoms;
A=a linear or branched, saturated or unsaturated alkylene group having 1 to 12 carbon atoms, preferably a linear or branched alkylene group having 1 to 4 carbon atoms;
Z=C$_1$-C$_{18}$alkyl group, preferably C$_1$-C$_4$alkyl group;
X=—NH$_2$; —NH—CO—R; —OOC—R; —O—N=C (R)$_2$ or OR';
R=a linear or branched, saturated or unsaturated C1-C$_{18}$alkyl radical, preferably a methyl, ethyl, propyl or isopropyl radical;

R'=R, preferably a methyl, ethyl, propyl or isopropyl radical; or an oxyalkylene radical having up to 4 carbon atoms, preferably —(CH$_2$—CH$_2$—O),—H and/or (CH$_2$—CH(CH$_3$)—O)$_m$—H; C$_5$-C$_8$cycloalkyl radical; a C$_6$-C$_{10}$aryl radical; or a C$_7$-C$_{12}$aralkyl radical;
m=1 to 40, preferably 1 to 20, more preferably 1 to 10;
n=0, 1 or 2.

In a particularly preferred embodiment of the invention the binder contains 3% to 10% by weight of an at least trifunctional polyisocyanate.

Depending on the required area of application, the radiation-curable binder of the invention, having barrier properties, may further contain up to 60% by weight of an inert solvent.

Solvents which can be used are in principle all those known to the skilled worker, particularly esters, ketones, halogenated hydrocarbons, alkanes, alkenes, and aromatic hydrocarbons. Examples of such solvents are methylene chloride, trifluoroethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, diisobutyl ketone, dioxane, ethyl acetate, ethylene glycol monobutyl ether acetate, ethylene glycol monoethyl acetate, 2-ethylhexyl acetate, glycol diacetate, heptane, hexane, isobutyl acetate, isooctane, isopropyl acetate, methyl ethyl ketone, tetrahydrofuran or tetrachloroethylene, or mixtures of two or more of said solvents.

The preparation of the radiation-curable binders of the invention, having barrier properties, may take place by means of customary techniques which are known to the skilled worker in the context of the preparation of polymeric mixtures.

Curing of the binder of the invention entails the formation of a network which comes about through the combination of different mechanisms of network formation:
a) the construction of an inorganic network by hydrolysis/alcoholysis/transetherification and polycondensation of the organosilicon compound as component (B),
b) the construction of an organic network by reaction of the free NCO groups of, in particular, components (A) and (B) with compounds that possess an acidic hydrogen atom,
c) the construction of an organic network by radiation curing.

Curing of the binder leads to coatings, fillers or sealants which are blocking-resistant—that is, non-tacky—and, in particular, scratch-resistant, having flexible properties, or else to adhesives with surface tack. The radiation-curable binders of the invention with barrier properties can therefore be employed as coating material, filler, sealant or adhesive and as adhesives, sealants or fillers are notable for barrier properties with respect to CO$_2$, O$_2$, N$_2$, gas mixtures, of CO$_2$ and N$_2$, for example, water vapor, and flavors.

In principle the radiation-curable binder of the invention with barrier properties can be used for filling, sealing, coating and adhesively bonding any of a very wide variety of materials. Examples of the materials include wood, metal, glass, plant fibers, stone, paper, cellulose hydrate, plastics such as polystyrene, polyethylene, polypropylene, polyethylene terephthalate, polyvinyl chloride, copolymers of vinyl chloride and vinylidene chloride, copolymers of vinyl acetate olefins, polyamides, or metal foils, made of aluminum, lead or copper, for example.

The radiation-curable binder of the invention, having barrier properties, can be applied to the substrate by all appropriate methods—for example, by spraying, knife coating, 3-4-roll applicators when using a solvent-free binder, or 2 roll applicators when using a solventborne binder.

The radiation-curable binder of the invention with barrier properties is suitable for coating substrates made of glass, metal, plastic, paper, ceramic, etc., by dipping, pouring, spreading, spraying, electrostatic spraying, electrodeposition coating, etc. The binders are suitable particularly for coating optical, optoelectrical or electronic articles and for coating containers for motor fuels and heating fuels.

The radiation-curable binder of the invention provides adhesives which have barrier properties and possess preferential suitability for the production of film composites. The presence of less than 0.1% by weight of monomeric polyisocyanate makes the binder particularly suitable for flexible film composites used in the food packaging sector.

The present invention accordingly further provides a process for producing film composites which are obtainable by bonding part of, or the full, area of films, using the radiation-curable binder of the invention with barrier properties.

Application of the binder to the films that are to be bonded may take place using machinery commonly employed for such purposes, such as conventional laminating machines. Particularly appropriate is the application of the binder in the liquid state to a film that is to be bonded to form a laminate: for example, a film of plastic or of metal (foil). The viscosity of the binder is chosen such that under typical processing temperatures it has a viscosity of about 1000 mPas to about 5000 mPas (measured according to Brookfield, Digital Viscometer RVT DV-II, spindle 27). Typical processing temperatures are, for example, about 25 to about 70° C. for the production of flexible packaging films, about 70 to about 80° C. for the lamination of high-gloss films, and about 80 to about 130° C. in the case of applications in the textile sector. The foil or film thus coated with the solvent-containing or solvent-free radiation-curable binder of the invention, having barrier properties, is subjected initially to initial thermal crosslinking (initial condensation) in a drying tunnel at 40 to 120° C., then laminated to at least one further film or foil, under pressure where appropriate, and subsequently irradiated, or irradiated and then laminated.

As a result of the irradiation and associated crosslinking reaction, the radiation-curable binder of the invention with barrier properties gains in molecular weight, and hence has greater cohesion, and possesses a tacky surface. If the irradiation is by means of UV light, the binder employed in accordance with the invention includes at least one photoinitiator as component (E).

The process described can be repeated a number of times, thereby allowing film composites to be produced which consist of more than two bonded layers. The process of the invention can be carried out under a protective-gas atmosphere, i.e., in the presence of inert gases such as nitrogen. However, it can also be carried out advantageously, without problems, under the normal atmosphere typically prevailing in production halls.

The invention additionally provides a composite film produced by the process of the invention using the binder of the invention. The composite film is suitable for use in particular as a barrier film for packaging foods. Within the art of food packaging, films are referred to as barrier films when the oxygen permeability Q ($O_2$)<100 cm$^3$/(m$^2$×day×bar) and the water vapor permeability Q ($H_2O$)<10 g/(m$^2$×day) at 23° C. and 85% relative humidity (Delventhal, Verpackungs-Rundschau March 1991, pages 19-23).

The invention is illustrated below by means of examples.

EXAMPLES

A. Substances Used:

A.1 Component (A):
  LIOTRON UR 4599-22 (solvent-free) and LIOTRON UR 4599-21 (solventborne): (reaction product of tripropylene glycol-hexamethylene diisocyanate with hydroxy acrylate); Henkel KGaA
  LIOTRON UR 4532 (polyurethane prepolymer with free isocyanate and acrylate group), Henkel KGaA,
  LIOTRON UR 4619 (polyurethane prepolymer based on 4,4-MDI, 60% in ethyl acetate, Henkel KGaA,
  ROSKYDAL UA VP LS 2266 (epoxy acrylate resin, isocyanate-containing); Bayer AG
  ROSKYDAL UA VP LS 2337 (NCO-modified urethane acrylate); Bayer AG.

A.2 Component (B)
  Reaction product of isophorone diisocyanate (IPDI) and DYNASILAN 1120 (Mixture of bis(3-triethoxysilylpropyl)amine and 3-aminopropyltriethoxysilane) having an NCO value of 18% to 22% by weight and a viscosity of 800 to 1200 mPas (25° C.).
  Reaction product of DESMODUR N 100 (N,N',N"-tri(isocyanato-hexamethylene)diurein) with bis(3-triethoxysilylpropyl)amine and 3-aminopropyltriethoxysilane) having an NCO value of 11.5% to 12.5% by weight and a viscosity of 60 to 80 mPas (25° C.).

A.3 Component (C): Curing Agents
  LIOFOL UR 6801; LIOFOL UR 6051; LIOFOL UR 6092, LIOFOL UR 6090, LIOFOL UR 6082, LIOFOL UR 6065

Manufacturer and supplier: Henkel KGaA

A.4 Component (D)
  Tetraisopropyl titanate. Degussa

A.5 Component (E)
  Photoinitiator IRGACURE PI 2959, Ciba

A.6 Component (F)
  EBECRYL TPGDA (tripropylene glycol diacrylate), UCB Chemicals B. Laminating Adhesive Examples:

B.1 Solventborne Adhesive
a) 1 mol of LIOTRON UR 4619 and 1 mol of the IPDI/DYNASILAN 1120 reaction product were used. The curing agent LIOFOL UR 6801 was added, calculated on an NCO/OH ratio of approximately 1.5:1. Based on the total amount of components used up to that point, 2% by weight of tetraisopropyl titanate was then added.
b) 1 mol of LIOTRON UR 4619 and 1 mol of the IPDI/DYNASILAN 1120 reaction product were mixed and the curing agent LIOFOL UR 6051 was added, the addition of curing agent being calculated on an NCO/OH ratio of approximately 1.5:1. Subsequently, based in each case on the total amount of the components used up to that point, 5% by weight of tripropylene glycol diacrylate (TPGDA) and 2% by weight of tetraisopropyl titanate were added.

B.2 Solvent-Free Adhesive a) 1 mol of the IPDI/DYNASILAN 1120 reaction product was added to 1 mol of LIOTRON UR 4599 and the curing agent LIOFOL UR 6092 was added, the addition of curing agent being calculated on an NCO/OH ratio of approximately 1.5:1. Subsequently, based in each case on the total amount of the components used up to that point, 8% by weight of TPGDA, 3% by weight of tetraisopropyl titanate and 10% by weight of ROSKYDAL UA VP LS 2337 were added.

b) 1 mol of the IPDI/DYNASILAN 1120 reaction product was added to 1 mol of LIOTRON UR 4532. Subsequently, based in each case on the total amount of the components used up to that point, 10% by weight of TPGDA and 10% by weight of ROSKYDAL UA VP LS 2337 were added.

C. Coating Examples:

C.1 Solventborne Coating a) 1 mol of LIOTRON UR 4619 and 1 mol of the IPDI/DYNASILAN 1120 reaction product were used. Based on the total amount of the components used up to that point, 10% by weight of TPGDA and 20% by weight of ROSKYDAL UA VP LS 2337 were added. Subsequently the curing agent LIOFOL UR 6051 was added, calculated on a total NCO/OH ratio of approximately 1.5:1.

b) 1 mol of LIOTRON UR 4619 and 1 mol of the IPDI/DYNASILAN 1120 reaction product were mixed. Subsequently, based on the total amount of the components used up to that point, 10% by weight of TMP acrylate, 20% by weight of epoxy acrylate, 3% by weight of tetraisopropyl titanate, and 10% by weight of ROSKYDAL UA VP LS 2337 were added. The curing agent UR 6051 was then added, the addition of curing agent being calculated on a total NCO/OH ratio of approximately 1.5:1.

C.2 Solvent-Free Barrier Coating 1 mol of LIOTRON UR 4532 was admixed with 1 mol of the IPDI/DYNASILAN 1120 reaction product. Based on the total amount of the components used up to that point, 20% by weight of ROSKYDAL UA VP LS 2337, 15% by weight of epoxy acrylate, 10% by weight of TMP acrylate, 10% by weight of TPGDA and 3% by weight of tetraisopropyl titanate were added.

D. Measurement Methods:

The monomeric polyisocyanate was determined by means of gel permeation chromatography (GPC) or high-performance liquid chromatography (HPLC) in accordance with an in-house method.

The viscometric data were determined using a Brookfield Digital Viscometer RVT DV-II, spindle 27.

E. Laminating Tests:

The components were mixed, applied to the film material, and heated at 80° C. in a drying tunnel.

Lamination took place using:
*film of oriented polypropylene (OPP film),
*film of polyester (PET film),
(film of oriented polyamide (OPA film), against OPP.
*)=also metallized or coated The application rate of the adhesive was 2 g/m² in each case.

This was followed by irradiation with electron beams or UV rays.

UV irradiation was carried out using a UV unit from Eltosch, equipped with a 120-W mercury lamp (UV dose ca. 180 mJ/cm²). (Photoinitiator: PI 2959.)

The laminated and irradiated material was aftercured at approximately 40° C. for at least 1 day.

What is claimed is:

1. A binder composition for providing barrier properties comprising:
   a) a compound containing at least one NCO group and at least one radiation-curable reactive functional group, as component (A), and
   b) an organosilicon compound as component (B),
   wherein component (B) is a reaction product of at least one polyisocyanate with at least one organosilicon compound of the formula (III):
   provided that the reaction product in component (B) contains at least one NCO group:

$$Y^1—A—Si(Z)_n(X)_{3-n} \quad (III);$$

wherein:
$Y^1$=—OH, —COOH, —SH, —NH$_2$, NHR" group;
R"=linear or branched, saturated or unsaturated $C_1$-$C_{18}$ alkyl; $C_5$-$C_8$ cycloalkyl, C6-$C_{10}$ aryl, $C_7$-$C_{12}$ aralkyl radical; oxyalkylene radical having up to 4 carbon atoms, A—Si((Z)$_n$)(X)$_{3-n}$;
an alkyl-, cycloalkyl- or aryl-substituted siloxane radical containing about 1 to about 20 silicon atoms;
A=a linear or branched, saturated or unsaturated alkylene group having 1 to 12 carbon atoms;
Z=a $C_1$-$C_{18}$ alkyl group;
X=—NH$_2$; —NH—CO—R; —OOC—R; —O—N=C(R)$_2$ or OR';
R=a linear or branched, saturated or unsaturated $C_1$-$C_{18}$ alkyl radical;
R'=R; or an (oxyalkylene)$_m$ radical wherein the oxyalkylene has up to 4 carbon atoms; a $C_5$-$C_8$ cycloalkyl radical; a $C_6$-$C_{10}$ aryl radical or a $C_7$-$C_{12}$ aralkyl radical;
m=1 to 40; and
n=0, 1, or 2.

2. The binder composition of claim 1, having a viscosity at 70° C. of 100 mPa·s to 26,000 mPa·s.

3. The binder composition of claim 1, wherein component A is a reaction product of at least one polyisocyanate with at least one (meth)acrylate of the formula $$H_2C=CR^1—C(=O)—O—R^2—Y \quad (II)$$

where Y=an NCO-reactive group;
$R^1$=H or CH$_3$;
$R^2$=a saturated or unsaturated linear or branched alkylene group having 2 to 21 carbon atoms, or a $C_2$-$C_4$ alkylene oxide group.

4. The binder composition of claim 3, wherein Y=OH, COOH, SH, NH$_2$, or NHR$^3$ and R$^3$=linear or branched, saturated or unsaturated $C_1$-$C_{18}$ alkyl radical; $C_5$-$C_8$ cycloalkyl, $C_6$-$C_{10}$ aryl, or $C_7$-$C_{12}$ aralkyl.

5. The binder composition of claim 4, wherein R$^2$ is a $C_2$-$C_4$ alkylene oxide group selected from the group consisting of ethylene oxide groups having 2 to 10 ethylene oxide units per group and propylene oxide groups having 1 to 7 propylene oxide units per group.

6. The binder composition of claim 3, wherein the polyisocyanate is selected from the group consisting of 1,5-naphthylene diisocyanate, 2,2'-, 2,4- and 4,4'diphenylmethane diisocyanate (MDI), isomers of tolylene diisocyanate (TDI), 1-isocyanatomethyl-3-isocyanato-1,5,5-trimethylcyclohexane (IPDI), hexane 1,6- diisocyanate(HDI), tetramethyixylylene diisocyanate (TMXDI), trimerization products of the isocyanates HDI, MDI, TDI or IPDI; and NCO-terminated polyurethane prepolymers; and mixtures thereof.

7. The binder composition of claim 3, wherein the polyisocyanate is an NCO-terminated polyurethane prepolymer containing less than 0.5% by weight of free polyisocyanate selected from the group consisting of: 1-isocyanatomethyl-3-isocyanato-1,5,5-trimethylcyclohexane (IPDI),1,5-naphthylene diisocyanate, 2,2'-, 2,4-and 4,4'diphenylmethane diisocyanate (MDI), and isomers of tolylene diisocyanate (TDI), based on the total amount of polyurethane prepolymer.

8. The binder composition of claim 1, wherein A=a linear or branched alkylene group having 1 to 4 carbon atoms.

9. The binder composition of claim 1, wherein R' is an oxyalkylene radical selected from the group consisting of $(C_2H_4-O)_m-H$ and $(CH_2-CH(CH_3)-O)_m-H$ and m=1 to 40.

10. The binder composition of claim 1, wherein the organosilicon compound of the formula (III) is selected from the group consisting of 3-amino-propyltrimethoxysilane, 3-aminopropyldimethoxymethylsilane, 3-amino-propyltriethoxysilane, 3-aminopropyldimethoxyphenylsilane, 3-aminopropyldiethoxyethylsilane, 3-aminopropyltrimethoxysilane, bis(3-tri-ethoxysilylpropyl)amine, and mixtures thereof.

11. The binder composition of claim 1, comprising
I) 5% to 95% by weight of the compound containing at least one NCO group and at least one radiation-curable reactive functional group, as component (A);
II) 5% to 95% by weight of the reaction product of at least one polyisocyanate with at least one organosilicon compound of formula (III) said reaction product containing at least one NCO group as component (B);
III) 0 to 90% by weight of a curing agent as component (C);
IV) 0 to 12% by weight of a metal compound of the formula (IV) $MR^4_x$ (IV)
wherein:
M=Ge, Sn, Pb, Ti, Zr, B, Al;
X=3 or 4; and
$R^4$=halogen, hydroxyl, alkoxy, alkoxycarboxyl group, wherein the $R^4$ radicals are identical or different, as component (D);
IV) 0 to 15% by weight of a photoinitiator as component (E);
V) 0 to 80% by weight of an NCO-free compound containing at least one functional group which is polymerizable by irradiation with UV light or with electron beams, as component (F);
VI) 0 to 50% by weight of one or more additives selected from the group of plasticizers, stabilizers, antioxidants, colorants and fillers, as component (G),
the sum of the stated components (A)-(G) being 100% by weight.

12. The binder composition of claim 1, comprising
I) 20% to 90% by weight of the compound containing at least one NCO group and at least one radiation-curable reactive functional group, as component (A);
II) 10% to 80% by weight of the reaction product of at least one polyisocyanate with at least one organosilicon compound of formula (III) said reaction product containing at least one NCO group, as component (B);
III) 5 to 60% by weight of a curing agent as component (C);
IV) 0.5 to 10% by weight of a metal compound of the formula (IV) $MR^4_x$ (IV),
wherein:
M=Ge, Sn, Pb, Ti, Zr, B, Al;
X=3 or 4; and
$R^4$=halogen, hydroxyl, alkoxy, alkoxycarboxyl group, wherein the $R^4$ radicals are identical or different, as component (D);
IV) 0.5 to 10% by weight of a photoinitiator as component (E);
V) 0.5 to 40% by weight of an NCO-free compound containing at least one functional group which is polymerizable by irradiation with UV light or with electron beams, as component (F);
VI) 0 to 50% by weight of one or more additives selected from the group of plasticizers, stabilizers, antioxidants, colorants and fillers, as component (G),
the sum of the stated components (A)-(G) being 100% by weight.

13. A method for coating, filling, sealing or adhering a substrate, comprising using the binder composition of claim 1.

14. A method of producing a film composite using a binder composition, comprising using the binder composition of claim 1.

15. The method of claim 14, wherein said film composite comprises at least two polymeric films that are identical or different and wherein the binder composition of claim 1 is used to join said at least two polymeric films.

* * * * *